United States Patent
Bonas

(10) Patent No.: US 9,077,627 B2
(45) Date of Patent: Jul. 7, 2015

(54) REDUCING IMPACT OF RESOURCE DOWNTIME

(75) Inventor: Alissa Bonas, Kiryat Bialik (IL)

(73) Assignee: Hewlett-Packard Development Company, L.P., Houston, TX (US)

(*) Notice: Subject to any disclaimer, the term of this patent is extended or adjusted under 35 U.S.C. 154(b) by 651 days.

(21) Appl. No.: 13/073,715

(22) Filed: Mar. 28, 2011

(65) Prior Publication Data

US 2012/0254395 A1    Oct. 4, 2012

(51) Int. Cl.
*G06F 15/173* (2006.01)
*H04L 12/24* (2006.01)

(52) U.S. Cl.
CPC ................................. *H04L 41/0836* (2013.01)

(58) Field of Classification Search
USPC ................ 370/230, 332; 709/4, 17, 223, 224
See application file for complete search history.

(56) References Cited

U.S. PATENT DOCUMENTS

| | | | |
|---|---|---|---|
| 6,021,437 A | 2/2000 | Chen et al. | |
| 7,269,128 B2 * | 9/2007 | Taylor | 370/216 |
| 7,577,701 B1 | 8/2009 | Johns et al. | |
| 7,904,553 B1 * | 3/2011 | Ham et al. | 709/224 |
| 7,907,517 B2 * | 3/2011 | Steven | 370/216 |
| 2002/0120727 A1 | 8/2002 | Curley et al. | |
| 2002/0152305 A1 * | 10/2002 | Jackson et al. | 709/224 |
| 2003/0217078 A1 * | 11/2003 | Carlson et al. | 707/200 |
| 2004/0249935 A1 | 12/2004 | Jackson et al. | |
| 2006/0187833 A1 * | 8/2006 | Montulli et al. | 370/230 |
| 2007/0010983 A1 * | 1/2007 | Bauer et al. | 703/17 |
| 2007/0266383 A1 * | 11/2007 | White | 718/1 |
| 2008/0089295 A1 * | 4/2008 | Keeler et al. | 370/332 |
| 2008/0184241 A1 * | 7/2008 | Headrick et al. | 718/102 |
| 2009/0006884 A1 * | 1/2009 | Cahill et al. | 714/4 |
| 2009/0183162 A1 * | 7/2009 | Kindel et al. | 718/103 |
| 2009/0300173 A1 * | 12/2009 | Bakman et al. | 709/224 |
| 2010/0115048 A1 * | 5/2010 | Scahill | 709/213 |
| 2011/0133945 A1 * | 6/2011 | Klein et al. | 340/652 |
| 2012/0058728 A1 * | 3/2012 | Wang et al. | 455/62 |

OTHER PUBLICATIONS

John Wu, Reducing Server Downtime Network Monitoring and Change Control Reduce Embarrassing Outages, Suite101.com, Jun. 23, 2009.

* cited by examiner

*Primary Examiner* — Chi H Pham
*Assistant Examiner* — Raul Rivas
(74) *Attorney, Agent, or Firm* — Trenner Law Firm, LLC

(57) ABSTRACT

Systems and methods of reducing impact of resource downtime. In an example, a method includes monitoring user access to the resource. The method also includes identifying baseline patterns in the monitored user access to the resource. The method also includes defining downtime for the resource based on the baseline patterns and expected time for taking the resource down.

20 Claims, 4 Drawing Sheets

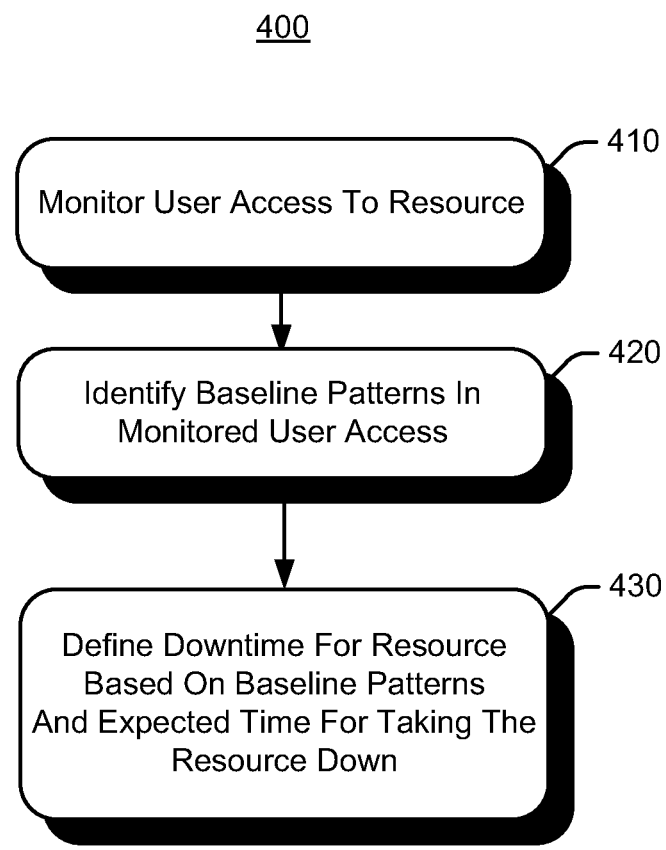

REDUCING IMPACT OF RESOURCE DOWNTIME

BACKGROUND

Modern data centers and online computing resources offer a consolidated environment for maintaining, and upgrading hardware and software, while providing convenient remote access from any location that has network access. Data centers may be used to provide computing resources for enterprises (e.g., "cloud computing" and Internet) and to the public at large (e.g., via e-commerce sites or any other service such as email and "apps"). While a data center may go offline without notice due to, for example, an outright hardware or software failure, most downtime is foreseeable and can be scheduled in advance for minimal disruption.

A system administrator typically schedules downtime for the system and/or network using a time-based approach. For example, the system administrator may schedule downtime late at night or on weekends so as not to inconvenience users during regular business hours. The system administrator may also notify users of the anticipated downtime so that users can make alternative plans for accessing the network during that time.

Simply scheduling downtime at night or on the weekends may have unintended consequences, particularly in organizations with users and customers located all over the world. Downtime for business networks may result in lost productivity. Downtime for e-commerce may result in lost sales. Potential customers may abandon their attempts to access an e-commerce site and may never return.

BRIEF DESCRIPTION OF THE DRAWINGS

FIG. 4 is a flowchart illustrating exemplary operations which may be implemented for reducing impact of resource downtime.

DETAILED DESCRIPTION

Systems and methods are disclosed which reduce impact of resource downtime by suggesting the timeframes when resource(s) are least used. The systems and methods are applicable to data centers used to provide computing resources for enterprises (e.g., "cloud computing" and Internet) and to the public at large (e.g., via e-commerce sites).

By way of illustration, a system administrator may need to schedule resource downtime for all or a portion of the data center to upgrade or reconfigure a hardware or software component. Previous techniques have relied on trial and error approaches, where the system administrator attempts to guess when there is little demand for the resources in the data center. These techniques are typically time based. For example, the system administrator may schedule downtime late at night or on weekends so as not to inconvenience users during regular business hours. Many organizations and e-commerce sites have employees and customers located throughout the world. In a global environment, scheduling based on local time-of-day ignores the different time zones throughout the world.

The systems and methods described herein may be used to reduce the impact of resource downtime using an automated (or semi-automated) approach based on actual use metrics. A monitor (e.g., an agent external to any of the resources) may be used to monitor user traffic for resource(s) in the data center (e.g., user requests and/or responses). The monitored data may be used to identify baseline trends in user traffic. Downtime may be defined for a data center based on the baseline trends and may be defined automatically, manually (e.g., by an administrator using suggestions from the system), or using a combination of automatic and manual approaches.

The defined downtime may be used by a system administrator for manual scheduling, automatically scheduled, or scheduled using a combination of both automatic and manual techniques. Defined downtime may also expressly exclude times of high demand. In an example, enforcement mechanisms may be implemented to preclude scheduling downtime outside of the defined downtime. In another example, defined downtime includes windows for executing a larger downtime job as multiple smaller jobs.

As such, the system administrator may schedule resource downtime when there is mostly likely to be little or no demand. Smaller data centers benefit by defining downtime based on actual use metrics, because it reduces or altogether eliminates the inconvenience of users not being able to access the resources. Even larger data centers (e.g., those having failover or high-availability resources that can be used during downtime) also benefit by defining downtime based on actual use metrics, because even taking a few resources offline during times of high demand can impact responsiveness of the alternative or backup resources.

Figure 1:
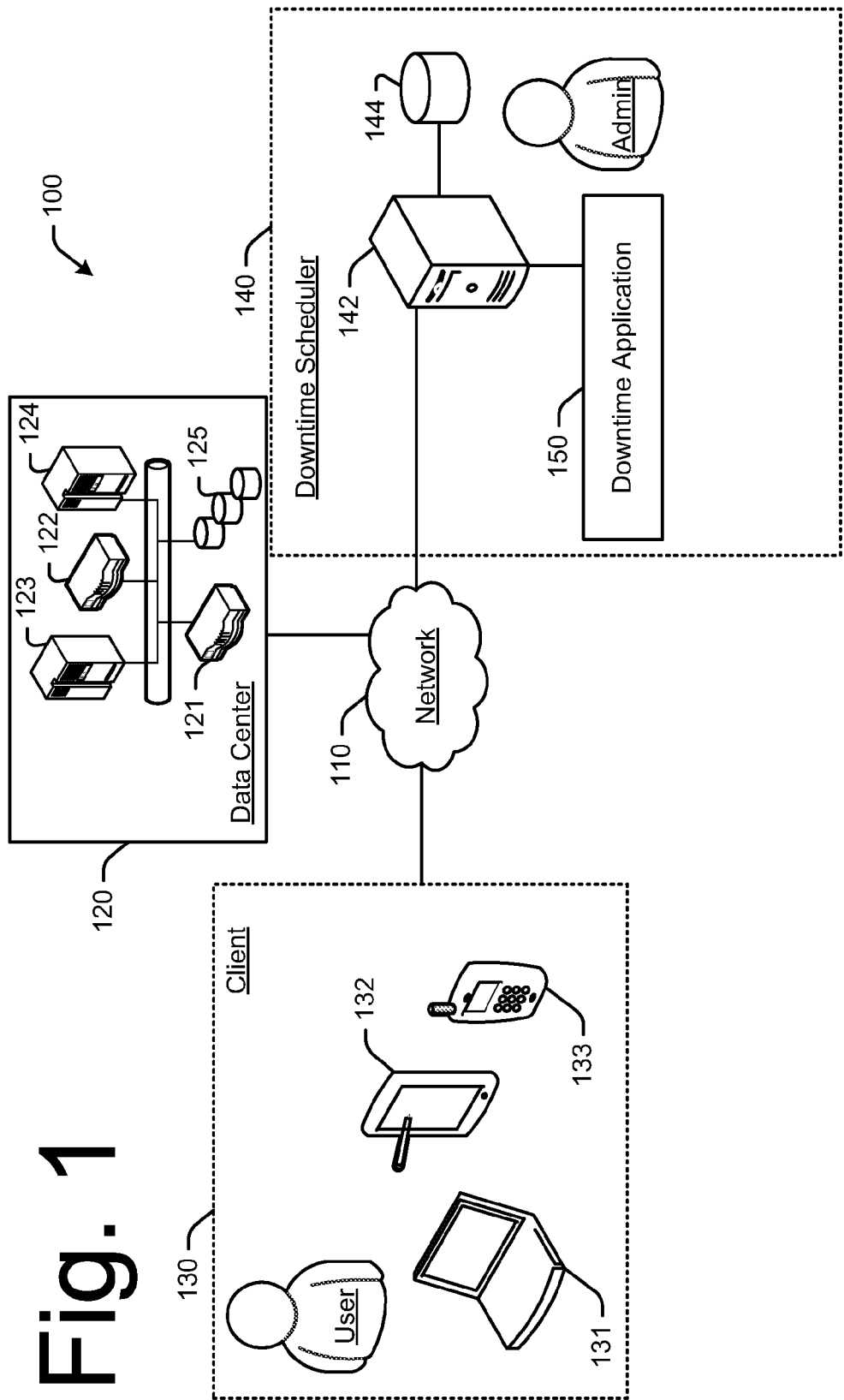
FIG. 1 is a high-level illustration of an exemplary networked computer system which may be implemented for reducing impact of resource downtime.

FIG. 1 is a high-level illustration of an exemplary networked computer system 100 which may be implemented for reducing impact of resource downtime. The networked computer system 100 may include one or more communication networks 110, such as a local area network (LAN) and/or wide area network (WAN), providing access to a data center 120.

Data center 120 may be any size (e.g., a single server or a multi-resource system) and may be housed at a single facility, or distributed across multiple facilities. Data center 120 provides access to resources by users at different locations via the network 110.

Regardless of the physical location of the data center 120, communications in data centers are typically network-based. The most common communications protocol is the Internet protocol (IP), however, other network communications (or combinations) may also be used. The data center 120 may be connected by routers 121 and switches 122 and/or other network communications devices that move user traffic between the servers 123, 124, storage devices 125, and/or other resources in the data center 120. The network devices may also make connections with the network 110 to provide external access to the resources of the data center 120.

Some of the resources in the data center 120 are used for basic communications services (both with internal and external entities), such as email servers, proxy services, etc. Both on-site and off-site security and monitoring resources may also be deployed as part of the data center 120. The data center 120 may also include physical security and environmental (e.g., cooling) components.

The main purpose of the data center 120 is providing client(s) 130 access to the resources, including but not limited to data processing resources, data storage, and/or application access. Providing the client(s) 130 access to the resources in the data center 120 may also include provisioning of the resources, e.g., via file servers, application servers, and the associated middleware.

The terms "client" and "clients" 130 as used herein refer to a computing device through which user(s) may access resources in the data center 120. Client computing devices 131-133 may include any of a wide variety of computing systems, such as a stand-alone personal desktop or laptop computer (PC), workstation, personal digital assistant (PDA), smart phone, or appliance, to name only a few examples. Each of the client computing devices 131-133 may include memory, storage, and a degree of data processing capability at least sufficient to manage a connection to the network 110 either directly or indirectly. Client computing devices may connect to network 110 via any suitable network communication protocol, such as via an Internet service provider (ISP).

The user(s) may include anybody (or any entity) who desires access as a client 130 to resource(s) in the data center 120. For purposes of illustration, the user may be an engineer at an enterprise. The engineer may access the processing and data storage resources in the data center 120 for a large-scale data analysis project. In yet another illustration, the user may be an e-commerce customer. The e-commerce customer accesses web pages via the Internet on a file server in the data center 120, to view and purchase products and/or services.

The "users" who access the data center 120 as a client 130 may be different than those who access a downtime scheduler 140. To make this distinction clear, those who access and use the downtime scheduler 140 are referred to herein as a "system administrator." It is possible that the system administrator may also be a user who accesses the data center 120, but would do so in the role of a "user." The system administrator may be in charge of resources in the data center 120, including upgrades and maintenance. Accordingly, the system administrator may use the downtime scheduler 140 to determine when the data center (or resource(s) within the data center) can be taken offline for upgrades, maintenance, or other purpose.

The downtime scheduler 140 may be implemented in the networked computer system 100 via any suitable computing system, including for example, a server 142 with computer-readable storage 144. The downtime scheduler 140 may execute a downtime application 150 implemented in machine readable instructions (e.g., software or other program code).

In an example use case, the system administrator may desire to take all or a portion of the network offline for upgrades and/or maintenance. For example, the system administrator may be planning to install a new operating system on the file server, upgrading firmware or installing software (e.g., a data structure application), or servicing or replacing hardware.

The downtime scheduler 140 may access monitored user traffic for the data center 120. User traffic may be monitored between clients 130 and the data center 120 at large, for particular resource(s) in the data center 120, or a combination of both. In an example, the downtime scheduler 140 accesses monitored user traffic from monitor(s) that are external to any of the resources in the data center 120. Accessing may include passively receiving and/or actively obtaining. For example, the monitors may intercept (or passively read) user traffic. Accordingly, the monitors can be readily deployed in the data center independently of the resources. That is, the monitors do not need to be installed as agents on the resources (which may result in decreased performance of the resources).

The downtime scheduler 140 may access traffic that has been monitored and persisted on an ongoing basis, for predetermined times, or only when requested (e.g., by the system administrator). In one example, the downtime scheduler 140 may continually access information about the monitored traffic, which can be stored in a suitable data structure to provide a historical perspective. In another example, the downtime scheduler 140 may only access data from the monitors on an as-needed basis (e.g., when the system administrator desires to schedule downtime). In this example, the monitors do not need to be monitoring user traffic when there is no desire by the system administrator to schedule downtime.

When the system administrator desires to schedule downtime for resource(s) or the entire data center 120, the downtime scheduler 140 executes program code to determine an optimum (or least disruptive) time for taking all or part of the resource(s) down. The program code may be embodied as a downtime application 150.

In use, the downtime scheduler 140 may access an inventory maintained for resources in the data center 120. The inventory may include the identity of resource(s), characteristics or parameters for the resource(s), and the interoperability of resources. The inventory enables the downtime scheduler 140 to determine which resources will be affected during downtime. For example, taking one resource offline (such as a switch) may also take dependent resources offline (such as the servers and storage devices connected through the switch).

The downtime scheduler 140 may also access the monitored user traffic. In an example, monitored user traffic may be accessed from a data structure or other data structure (e.g., for a historical perspective). In another example, monitored user traffic may be accessed in real-time (or substantially in real-time) from the monitor(s). In yet another example, monitored user traffic may be accessed both from a data structure and from the monitors. In this example, a combination of historical and current user traffic may be used to identify historical trends and confirm that those historical trends are still valid based on current traffic patterns.

The downtime scheduler 140 executes downtime application 150 (e.g., the trend analysis module 242 shown in FIG. 2) to identify baseline trends in the monitored user traffic. Example baseline trends for an e-commerce site may indicate the data center 120 experience peak demand during the weeks leading up to a major holiday, on particular days of the week, and during the lunch and evening hours. Baseline trends may also be based on geographical descriptors, content (e.g., products offered for sale), and other factors.

It is noted that the baseline trends may implement any suitable level of granularity. For example, the downtime scheduler 140 may identify least disruptive times based on days, hours, or even minutes. The downtime scheduler 140 may also take into consideration factors such as availability of alternative or backup resources and/or even entire data centers (and the corresponding capabilities such as, firmware versions, drivers, logical and physical connections, and ability to handle overflow traffic), and alternative network paths, to name only a few examples.

The downtime scheduler 140 may also identify windows during which a larger downtime job may be executed in increments or as multiple jobs. Such an implementation may be used when a single large block of downtime cannot be readily identified. As an illustration, the system administrator may plan to replace multiple resources as part of a system-wide upgrade. The entire downtime for this job may be 12 hours, including a 5 hour physical install phase, a 5 hours software install phase, and a 2 hour test phase. But the job may be divided into increments, for example, including multiple 2 hour combined physical/software installation phases, and then a final test phase. Thus, instead of having to schedule a 12 hour downtime, the downtime scheduler 140 may instead identify a plurality of shorter duration downtimes in which to accomplish the different phases.

These and other uses of the downtime scheduler 140 may be better understood with reference to the details of the downtime application 150, described in more detail below with reference to FIG. 2.

Figure 2:
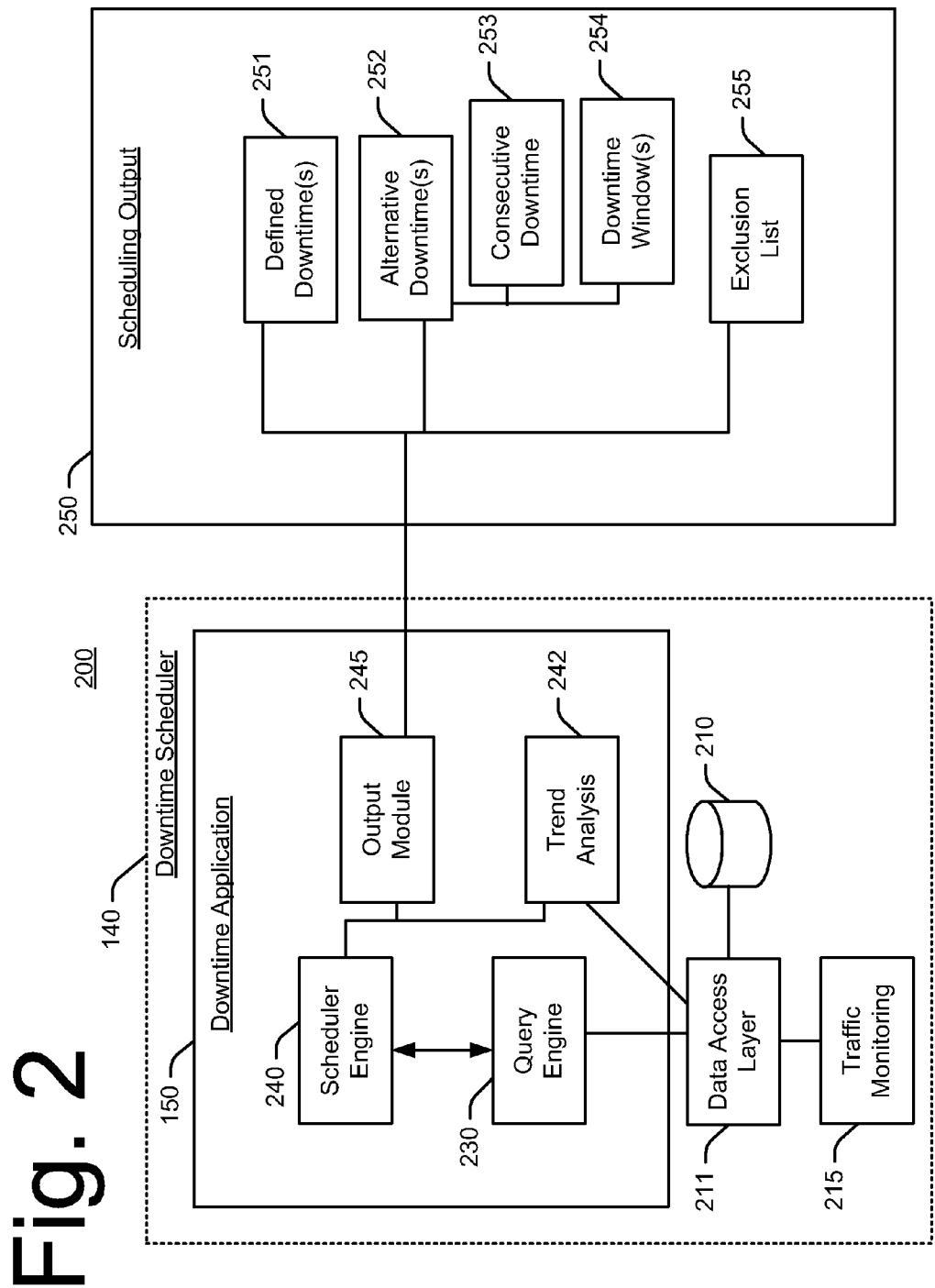
FIG. 2 shows an example architecture of machine readable instructions which may be executed to reduce impact of resource downtime.

FIG. 2 shows an example architecture 200 of machine readable instructions which may be executed to reduce impact of resource downtime. The machine readable instructions (such as but not limited to, software or firmware) may be stored on a computer readable medium and executable by one or more processor to perform the operations described herein. In an example, the machine readable instructions may be embodied as the downtime application 150 shown in FIG. 1. It is noted, however, that the components shown in FIG. 1 are provided only for purposes of illustration of an example operating environment, and are not intended to limit execution to any particular computing system.

The downtime application 150 may perform the function of the architecture of machine readable instructions as self-contained modules. These modules can be integrated within a self-standing tool, or may be implemented as agents that run on top of an existing data structure.

In an example, the downtime application 150 may perform operations on at least one data structure 210 to generate scheduling output 250. The data structure 210 may be provided on the same or different computer readable medium where the downtime application 150 resides. The data structure 210 may include information for monitored user traffic, in addition to information for the data center and resources.

The downtime application 150 may include a query engine 230 to interface with the data structure 210 and with an scheduler engine 240. The scheduler engine 240 may be an SQL-based stream analytics engine, and the query engine 230 may be an SQL query engine to interface with data structure 210. Scheduler engine 240 also executes functional modules 212 and 215, discussed below. In an example, the scheduler engine 240 may be integrated into the query engine 230.

The query engine 154 defines a unified query model over both static relations and dynamic streaming data. Techniques are implemented which extend the query engine 154 to support a unified model. A query execution mechanism may be implemented to enable an SQL query to be executed on a cycle-by-cycle basis for processing a data stream on a chunk-by-chunk basis, but without shutting the query instance down between chunks. Such an approach enables maintaining the application context across continuous execution cycles, e.g., for sliding-window oriented operations. The cycle-based transaction model, characterized by cycle-based isolation and visibility, may be used to deliver results of the analytics to the system administrator, even while the query for generating these results is continuously (or substantially continuously) running.

The scheduler engine 240 executes the analytics on data. In an example, the results are derived by a continuously running query, rather than multiple on-and-off queries. The results are derived from many (e.g., "infinite") events and therefore are themselves "infinite." Therefore, the continuous query runs cycle by cycle for processing the data stream on a chunk-by-chunk basis, and the query commits cycle-by-cycle to make chunk-wise results visible to users.

A request to schedule downtime may be accessed from the system administrator via any suitable interface, such as a graphical user interface or remote connection to a device interfacing with the system administrator. When the scheduler engine 240 accesses the request to schedule downtime for resource(s) in a data center, the scheduler engine 240 accesses information for monitored user traffic.

The scheduler engine 240 may retrieve monitored user traffic monitored (e.g., gathered or received) by traffic monitoring module 215. Traffic monitoring module 215 may gather information about monitored user traffic in real-time (or substantially in real-time) from monitor(s) in the data center 120. Traffic monitoring module 215 may also store information about monitored user traffic in data structure 210 via data access layer 211.

The scheduler engine 240 may also access a trend analysis module 242 to analyze the monitored user access and identify a baseline pattern. The trend analysis module 242 may implement statistical techniques and related algorithms to identify baseline trends, both current and historical. The scheduler engine 240 may use the baseline pattern to define a downtime for the resource based on the baseline pattern and the expected time for taking the resource down. After suitable downtime is defined, an output module 245 may construct scheduling output 250 for the system administrator. In an example, the scheduler engine 240 may store the defined downtime in a data structure for persistence (e.g., in memory for later and/or repeated use).

In an example, the downtime application 150 may access a proposed downtime for the resource, compare the proposed downtime to the defined downtime, and suggest an alternative downtime based on the defined downtime. The defined downtime may include a plurality of windows for executing a downtime job as multiple jobs.

Scheduling output 250 may be any suitable form, including storing in a file or other data structure for persistence. In such an example, the schedule may be viewed and/or modified (add new, edit, and/or delete entries). In any event, scheduling output 250 may include a defined downtime 251, alternative downtime(s) 252 (e.g., different downtime than suggested by the system administrator). Alternative downtime(s) 252 may be consecutive downtime 253 (e.g., from 1 pm to 2 pm on Wednesday) or downtime window(s) 254 (e.g., 1 to 1:30 pm and 3 to 3:30 pm on Wednesday). Scheduling output 250 may also include an exclusion list 255. The exclusion list 255 may identify times during which resources in the data center cannot be taken offline. An enforcement mechanism may be used to ensure that the resources are not scheduled to be taken offline during times indicated on the exclusion list 255.

It is noted that the functional modules are shown in FIG. 2 simply for purposes of illustration, and are not intended to be limiting in any manner. Still other functions and functional modules may also be provided. In addition, the functions and functional modules may be combined with one another or used independently of one another.

Figure 3:
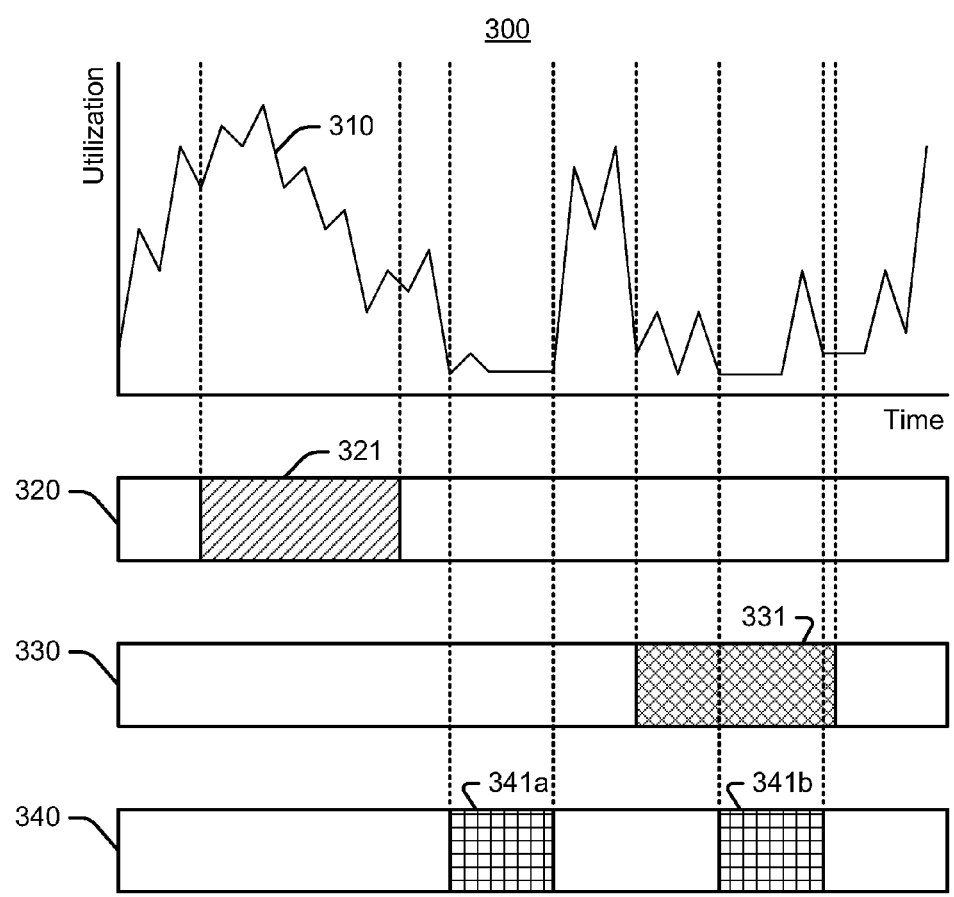
FIG. 3 illustrates scheduling resource downtime to reduce impact.

FIG. 3 illustrates scheduling resource downtime to reduce impact. In this example, the user administrator desires to schedule downtime for a portion of a storage subsystem in a data center (e.g., a storage area network (SAN)).

The topology of the SAN includes multiple resources, and not all of the resources necessarily need to be taken offline. Accordingly, the downtime scheduler 140 may first retrieve all configurations (e.g., dependencies and impact) for tiers or levels of resources for the SAN in the data center that may be affected by taking some of the SAN resources offline during the scheduled downtime. By dependencies, it is meant any resources that are connected or otherwise dependent on a resource that has been taken down. By impact, it is meant any loss of resources during the downtime (e.g., loss of processing and data storage capabilities when a server is taken offline). In an example, the downtime scheduler 140 may access an inventory maintained for the SAN resources in the data center 120. The inventory may include the identity of SAN resource(s), characteristics or parameters for the resource(s), and the interoperability of resources.

The inventory enables the downtime scheduler 140 to determine which SAN resources will be affected during downtime. For example, taking one SAN resource offline (such as a SAN switch) may also take dependent resources offline (such as the physical storage devices connected through the switch).

The downtime scheduler 140 may also access the monitored user traffic for the SAN resources. Monitored user traffic may be accessed from a data structure for a historical perspective of user traffic for the SAN. Monitored user traffic may also be accessed in real-time (or substantially in real-time) from traffic monitor(s) for the SAN. In this example, a combination of historical and current user traffic may be used to identify historical trends and confirm that those historical trends are still valid based on current traffic patterns for the SAN.

The downtime scheduler 140 executes downtime application 150 to identify baseline trends in the monitored user traffic for the SAN. Example baseline trends can be seen by the plot 300 of traffic patterns for the SAN.

In the example shown in FIG. 3, the system administrator may submit a request 320 to schedule downtime for the SAN during time 321. However, it can be seen by the baseline trends in plot 300 that time 321 would result in large disruptions for the users of the SAN. Instead, the downtime scheduler 140 may return a suggestion 330 which defines downtime 331 which would cause the least interruption for users of the SAN.

In another example, also shown in FIG. 3, the downtime scheduler 140 may return a suggestion 340 including windows 341a and 341b defining downtime. The windows 341a and 341b indicate times during which a larger downtime job may be executed in increments or as multiple jobs. Such an implementation may be used when a single large block of downtime cannot be readily identified. As an illustration, the system administrator may plan to replace multiple SAN switches as part of a system-wide upgrade. The entire downtime for this job may be 4 hours, including a 1 hour physical install phase, a 1 hour driver install phase, and a 2 hour test phase.

Here, the job may be divided into two increments, for example, including a 2 hour physical SAN switch installation phase, and then a 2 hour test phase. Thus, instead of having to schedule a block of 4 hour downtime, the system administrator may instead use a plurality of shorter duration downtimes suggested by the downtime application 140 in which to accomplish the different phases.

It is noted that the example discussed above of the SAN is only for purposes of illustration. The resource may be any resource, including physical, network, and/or software resources.

Before continuing, it is noted that the components depicted in the figures corresponding to the systems described above are merely exemplary of various configurations which may be implemented for reducing impact of resource downtime. However, the systems described herein are not limited to any specific components or configuration of those components. Still other embodiments are also contemplated, as will be readily understood by those having ordinary skill in the art after becoming familiar with the teachings herein.

FIG. 4 is a flowchart illustrating exemplary operations which may be implemented for reducing impact of resource downtime. Operations 400 may be embodied as logic instructions on one or more computer-readable medium. The term computer readable medium is inclusive of system memory (memory on which the program is installed as well as portable or remote memory that stores installation files for the program). Thus program code includes both the installed application and the installation files. When executed on a processor, the logic instructions cause a general purpose computing device to be programmed as a special-purpose machine that implements the described operations. In an exemplary implementation, the components and connections depicted in the figures may be used for reducing impact of resource downtime.

In operation 410, user access to the resource is monitored. In an example, operations may include listening to user traffic involving the resource by a third-party monitor (i.e., an external monitor and not by an agent installed on any particular resource). For example, monitoring user traffic may by intercepting data packets (e.g., by resolving and reporting each request). In another example, monitoring user traffic may be by sampling or reading data packets without intercepting the data packets (e.g., by "listening" without resolving each request).

In operation 420, baseline patterns are identified in the monitored user access to the resource. For example, baseline patterns may be based on historical data, real-time data (or substantially real-time data), or a combination of these. Baseline patterns may use any suitable level of granularity. Baseline patterns may also be adjusted for time zones (e.g., time zones where users or a large majority of users are located), characteristics (e.g., products or services being sold), and other factors.

In operation 430, downtime is defined for the resource based on the baseline patterns and expected time for taking the resource down. Defining downtime may generate an output with a scheduled downtime. Generating an output may include one or more of creating an electronic file, producing a hardcopy, causing a display on an electronic device, etc.

The operations shown and described herein are provided to illustrate exemplary implementations. It is noted that the operations are not limited to the ordering shown. Still other operations may also be implemented.

For purposes of illustration, further operations may also include scheduling the defined downtime in advance. Further operations may also include rescheduling a suggested downtime based on actual events. For example, if a downtime is suggested for a particular time based on analyzed trends and/or a system administrator's input, but the user traffic for the resource(s) is unexpectedly high during that time, the downtime may be rescheduled for a later time.

Still further operations may include receiving from a system administrator a proposed downtime for the resource, comparing the proposed downtime to the defined downtime, and suggesting an alternative downtime based on the defined downtime.

It is noted that the exemplary embodiments shown and described are provided for purposes of illustration and are not intended to be limiting. Still other embodiments are also contemplated.

The invention claimed is:

1. A method of reducing impact of resource downtime, comprising:
    monitoring user access to the resource;
    identifying baseline patterns in the monitored user access to the resource;
    accessing an inventory identifying the resource and at least one other resource dependent on the identified resource; and defining downtime for the resource based on the baseline patterns and expected time for taking the resource down and dependency of the at least one other resource on the resource, the downtime defined as at least one of a plurality of times that is less disruptive than other of the plurality of times to users of the resource when taking the resource down.

2. The method of claim 1, wherein the downtime is defined based on identifying the resource to be taken down and alternative resources available while the resource is taken down.

3. The method of claim 1, wherein defining downtime further generates an output with a scheduled downtime when there is no expected demand for the resource.

4. The method of claim 1, further comprising scheduling the defined downtime in advance of upgrades or maintenance to the resource.

5. The method of claim 3, further comprising rescheduling a suggested downtime based on actual events.

6. The method of claim 1, further comprising:
receiving the resource identification and a proposed duration of downtime for the resource:
comparing the proposed downtime to the defined downtime; and
suggesting an alternative downtime based on the defined downtime to avoid disrupting user access to the resource.

7. The method of claim 1, wherein the defined downtime includes a plurality of time windows when a single large block of downtime cannot be identified, the plurality of time windows enabling a single downtime job to execute as multiple separate jobs including multiple installation phases and then a final test phase.

8. The method of claim 1, further comprising defining downtime to exclude times of high demand and based on availability of alternative network paths.

9. The method of claim 1, further comprising precluding removing the resource from operation outside of the defined downtime.

10. A non-transient computer readable medium having program code stored thereon for reducing impact of resource downtime by:
identifying baseline patterns from monitored access to a resource;
accessing an inventory identifying the resource and a dependency of other resources on the resource; and
defining downtime for the resource based on the baseline patterns and expected time for taking the resource down and the dependency of the other resources, the defined downtime being at least one predicted time of a plurality of times that is less disruptive than other of the plurality of times to users of the resource when taking the resource down.

11. The program code of claim 10 further listening to user traffic involving the resource by a third-party monitor.

12. The program code of claim 10 further scheduling the defined downtime in advance of upgrades or maintenance to the resource.

13. The program code of claim 10 further rescheduling the defined downtime based on real-time events.

14. The program code of claim 10 further identifying the resource to be taken down and alternative resources for use when the resource is taken down.

15. The program code of claim 10 further:
using a proposed downtime for the resource;
comparing the proposed downtime to the defined downtime; and
suggesting an alternative downtime based on the defined downtime when the proposed downtime is outside of the defined downtime.

16. The program code of claim 10 further including notifying a user in advance of a scheduled downtime.

17. The program code of claim 10 further:
defining downtime to exclude times of high demand; and
precluding removing the resource from operation outside of the defined downtime and based on availability of alternative resources for the resource taken to be taken offline.

18. A system reducing impact of resource downtime, comprising a non-transient computer readable medium and a processor configured to execute instructions stored on the computer readable medium, wherein the medium includes program code instructions that, when executed, function as:
a traffic monitoring module to monitor data indicative of user access to a resource;
a trend analysis module to analyze the monitored user access and identify a baseline pattern; and
a scheduler engine to define a downtime for the resource based on the baseline pattern and expected time for taking the resource down, the scheduler engine retrieving all configurations including dependencies and impact for tiers of other resources dependent on the resource to be taken down, the defined downtime including at least one time predicted from a plurality of times that is less disruptive than others of the plurality of times to users of the resource when taking the resource down.

19. The system of claim 18, wherein the scheduler engine stores the defined downtime in a data structure for persistence.

20. The system of claim 18, further comprising a downtime application to:
access a proposed downtime for the resource;
compare the proposed downtime to the defined downtime; and
suggest an alternative downtime based on the comparison of proposed downtime and defined downtime, the alternative downtime avoid disrupting user access to the resource.

* * * * *

UNITED STATES PATENT AND TRADEMARK OFFICE
CERTIFICATE OF CORRECTION

PATENT NO. : 9,077,627 B2  Page 1 of 1
APPLICATION NO. : 13/073715
DATED : July 7, 2015
INVENTOR(S) : Alissa Bonas It is certified that error appears in the above-identified patent and that said Letters Patent is hereby corrected as shown below:

In the claims,

In column 8, line 66, in Claim 1, delete "resource:" and insert -- resource; --, therefor.

In column 9, line 21, in Claim 6, delete "resource:" and insert -- resource; --, therefor.

In column 10, line 24, in Claim 18, delete "system reducing" and insert -- system for reducing --, therefor.

Signed and Sealed this
Tenth Day of May, 2016

Michelle K. Lee
*Director of the United States Patent and Trademark Office*